Dec. 24, 1929.  S. MARCUS  1,740,660
DOLL EYES
Filed Aug. 26, 1927  2 Sheets-Sheet 1
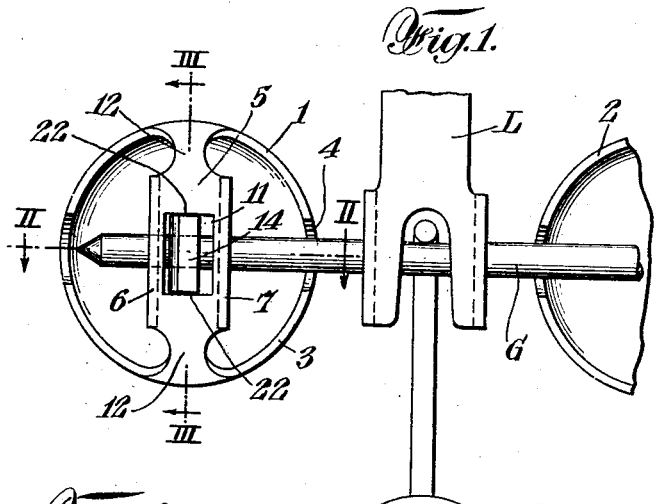
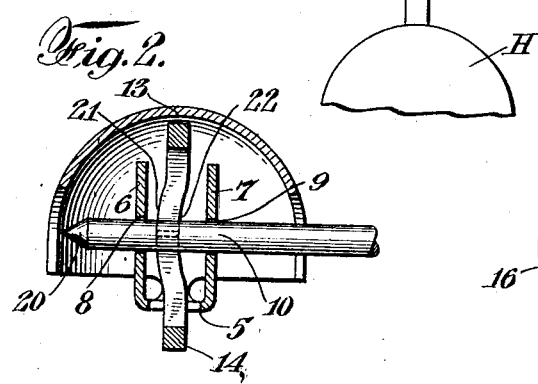
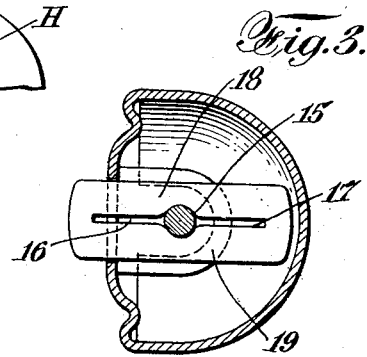
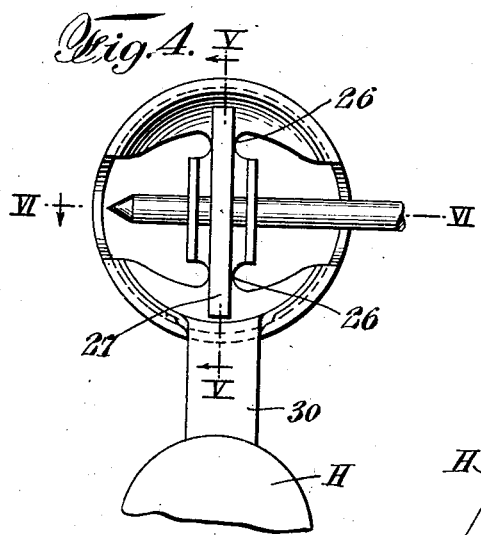
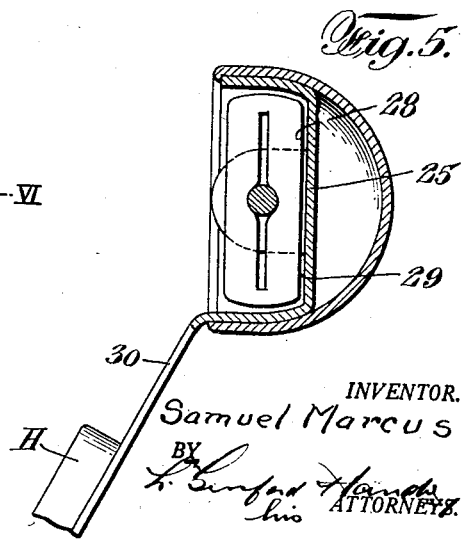
INVENTOR.
Samuel Marcus
BY
ATTORNEYS Dec. 24, 1929. S. MARCUS 1,740,660
DOLL EYES
Filed Aug. 26, 1927 2 Sheets-Sheet 2
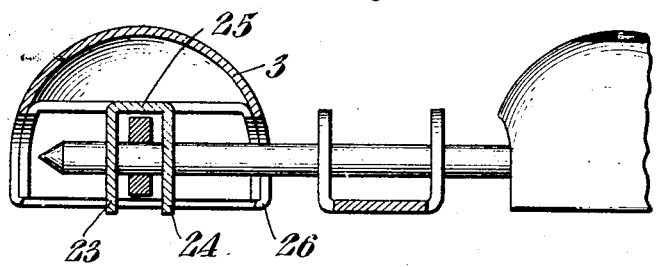
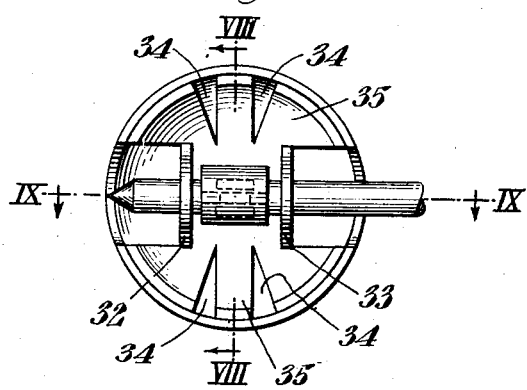
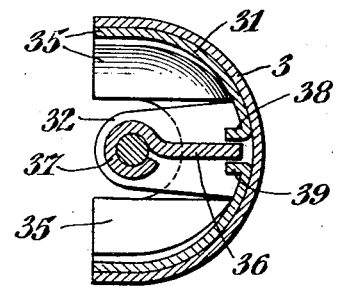
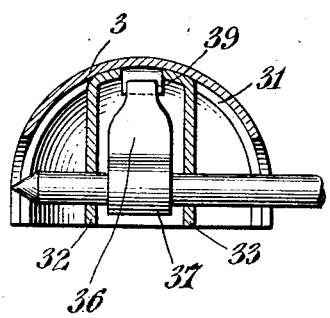
INVENTOR.
Samuel Marcus Patented Dec. 24, 1929

1,740,660

UNITED STATES PATENT OFFICE

SAMUEL MARCUS, OF BROOKLYN, NEW YORK, ASSIGNOR TO MARKON MANUFACTURING CO., INC., OF NEW YORK, N. Y., A CORPORATION OF NEW YORK

DOLL EYES  REISSUED

Application filed August 26, 1927. Serial No. 215,536.

This invention relates to an improvement in doll eyes, and particularly to the manner of constructing the eyes and attaching them onto a suitable support.

An object of the invention is to so construct the eyes and their attaching means that the eyes will be free to move longitudinally of their supporting part sufficiently to automatically find their own centres of oscillation in the eye sockets of the doll head, also to include limiting means for this automatic movement adapted to permit manual adjustment of the eyes in various directions.

A more detailed object is to provide an eye having spaced bearing parts loosely engaging the support, and to arrange a connector member frictionally engaging the support and loosely held between the bearing parts so that while the connector member will prevent any unintentional detachment of the eye from the support it will nevertheless permit a certain freedom of movement of the eye relative to the support such that the eye may automatically find its proper centre within the eye sockets of a doll head when the set is being mounted within the doll head, and so that the eye may maually adjusted at will either rotatably of the support or longitudinally of the support.

A further and more specific object is to provide a connector member comprising spring parts for frictionally gripping upon the cylindrical end portion of the cross rod usually employed in eye sets, the connector member being readily adjustable rotatably or longitudinally of the cross rod but its frictional grip upon the cross rod being sufficiently strong to retain it in any position to which it is adjusted, and to construct the eye so that it will provide parts engaging the cross rod and co-operative with the connector member to hold the eye loosely connected with the cross rod and capable of being adjusted with the connector member rotatably or longitudinally of the cross rod.

A further detailed object is to construct the eye with parts providing a pocket into which the connector member may be introduced and through which the cross rod may be forced by a simple movement which engages the cross rod both with the walls of the pocket and with the connector member.

A further detailed object is to so construct the eye that it may be adjustably rotated on a relatively vertical axis.

Other objects and aims of the invention, more or less specific than those referred to above, will be in part obvious and in part pointed out in the course of the following description of the elements, combination, arrangements of parts and applications of principles constituting the invention; and the scope of protection contemplated will be indicated in the appended claims.

In the accompanying drawings which are to be taken as a part of this specification, and in which I have shown merely a preferred form of embodiment of the invention:—

Fig. 1 is a rear elevational view of a portion of an eye set illustrating the eye and its mounting constructed in accordance with this invention.

Fig. 2 is a horizontal sectional view taken substantially upon the plane of line II—II of Fig. 1.

Fig. 3 is a transverse sectional view taken substantially upon the plane of line III—III of Fig. 1.

Fig. 4 is a rear elevational view of an eye showing a modified arrangement of the parts thereof.

Fig. 5 is a transverse sectional view taken substantially upon the plane of line V—V of Fig. 4.

Fig. 6 is a horizontal sectional view taken substantially upon the plane of line VI—VI of Fig. 4.

Fig. 7 is a rear elevational view of an eye showing a further modified construction of the parts thereof.

Fig. 8 is a transverse sectional view taken substantially upon the plane of line VIII—VIII of Fig. 7, and Fig. 9 is a horizontal sectional view taken substantially upon the plane of line IX—IX of Fig. 7.

Referring to the drawings for describing in detail the structures therein, and referring first to the structure Figs. 1 to 3, the reference character L indicates any suitable form of supporting bracket by means of which the usual cross rod as G may be mounted within a doll head, the bracket being connected with the cross rod intermediate the length of the cross rod in the instance illustrated but it being understood that the invention is not limited in this particular but that the cross rod may be supported either by its intermediate portion or by any other portion.

A suitable form of weight as H is shown connected with the cross rod for oscillating the cross rod by gravity in the usual manner, it being also understood that while this weight is herein illustrated as being connected with the mid portion of the cross rod the invention is not limited in this regard but that the weight may take any form and be connected with the cross rod at any point or points in the length of the cross rod, or even that it may be connected directly with the eyes instead of with the cross rod if preferred.

The two eyes as 1 and 2 of the eye set are identical and one only need be described in detail, viz: A semispherical shell as 3, of any approved material forms the main body of the eye. It may carry the pictorial representation of an iris in appropriate position directly upon its outer spherical surface or upon a celluloid or other covering shell, which may be utilized if desired. The rear of the shell 3 is open and is preferably formed with one or more notches as 4 therein in proper position to accommodate the cross rod G which extends across the rear of the shell and intersects the spherical centre thereof.

Extending vertically across the rear open side of the shell is a bridge 5 separately formed and attached to the shell or made integral with the shell as may be preferred. This bridge is provided with side flanges as 6 and 7 thereon bent forwardly into the hollow of the shell, being substantially parallel with each other and having aligned bearing apertures as 8 and 9 therethrough respectively adapted to receive the cylindrical end portion 10 of the cross rod, or other form of support, the bearing apertures being of such size as to permit the eye to be readily rotated upon the cross road or slid longitudinally along the cross rod but otherwise being a close fit upon the cross rod.

Centrally of the bridge is provided an opening 11, and the opposite end portions of the bridge are cut away to provide relatively reduced parts as 12—12 which are designed as localized regions upon which the bridge may be bent by application of manual force whenever it is desired to adjust the eye with respect to the cross rod upon a vertical axis.

The two flanges 6 and 7 define a sort of pocket within the eye shell the entrance to which is through the opening 11 at the rear end of the pocket and the forward end of the pocket being defined by the inner surface portion as 13 of the shell 3. Into this pocket is arranged a connector member as 14 having been inserted through the opening 11 and standing in position between the flanges 6 and 7, with its forward end adjacent the surface 13 and its rear end projecting rearwardly through the opening 11.

This connector member consists of an elongated piece of material, preferably metal, having a central circular opening as 15 through which the cross rod extends. A pair of slits as 16 and 17 extend longitudinally of the piece of material communicating with the opening 15 at opposite sides of said opening. The slits at their outer ends terminate short of the ends of the piece of material, and the opening 15 is normally of a slightly less diameter than the diameter of the cross rod so that when the cross rod is forced into the opening the two halves as 18 and 19 of the member at opposite sides of the slits are sprung or bowed apart by the forced entry of the cross rod and thereafter continue to exert a strong frictional grip upon the cross rod. The material from which this member is made is of course of a suitable springy character to permit the bowing of the halves 18 and 19 to generate the spring grip referred to.

In order to facilitate the convenient entry of the cross rod through the bearings 8 and 9, and particularly to facilitate its forced entry into the opening 15, the end of the cross rod is preferably tapered to a cone-shape as at 20.

Any appropriate means as may be desirable or necessary may be provided for holding the connector member in a proper position at right angles to the length of the cross rod when the cross rod is being forced into the opening 15, the connector member in the present instance having its mid portion off-set as at 21 so as to engage the flange 6 for this purpose. Incidentally the formation of the off-set portion 21 provides a relatively recessed portion as 22 at the opposite side of the connector member, which recessed portion assists in directing the end 20 of the cross rod into the opening 15, it being here noted that in assembling the parts the connector member is simply introduced endwise into the opening 11 until its inner end abuts the end wall 13 of the connector receiving pocket. In this position the opening 15 will be slightly forward of the bearing openings 8 and 9. The cross rod is then inserted and the tapered end 20, in being driven through the opening 15, will cam the connector member backwardly into alignment with the openings 8 and 9 so that the forward end of the connector member will thereafter stand free of the surface 13.

The connector member will be seen to have a firm frictional grip upon the cross rod of a character which while efficiently retaining the connector member in any position to which it is forced upon the cross rod will nevertheless permit ready manual adjustment of the connector member rotatably about the cross rod or slidably along the length of the cross rod.

The opening 11 is of a length, or height, corresponding very closely to the width of the connector member so that the end walls as 22—22 of the openings, which are spaced a considerable distance from the axial centre of the bearing openings 8 and 9, will stand in close contact with the opposite edges of the connector member and thus communicate any rotary movement of either the eye or the connector member to the other.

The width of the opening 11 is intended to be appreciably greater than the thickness of the connector member so that there will at all times be a limited amount of free movement of the eye longitudinally of the cross rod without accompanying movement of the connector member, this freedom of movement being designed to enable the eye to move automatically toward and away from the other eye of the set and to thus enable the two eyes to automatically find proper centres of rotation within the eye sockets of a doll head. Where the two eye sockets of a doll head happen to be spaced a greater distance one way or the other than is permitted by this automatic movement of the eyes then it will become necessary to manually move the connector member longitudinally of the cross rod, but it is intended that there shall be enough freedom of movement provided between the connector member and the opposite side walls of opening 11 to enable the eyes to automatically find their proper centres of rotation in the majority of cases, that is in all doll heads which are of a supposedly given size. Generally speaking the manual adjustment of the connector member longitudinally of the cross rod will be necessary only in adapting a given eye set to be used in a doll head where the eye sockets of the head are of a radically different spacing than was originally intended for the given eye set.

The eye and its mounting as thus described provides for an easy assembly of parts, all of simple and inexpensive design, for easy manual adjustment of the eye longitudinally of its support, or rotatably about the support or transversely of the support, and at the same time provides an automatic adjustment which is highly desirable.

Disassembly of the parts may be effected with the same ease as the assembly, namely by simply sliding the eye off the end of the the cross rod.

In the modification Figs. 4 to 6 the essential principles of construction are the same as already described. In this instance however the two arms or flanges as 23 and 24, corresponding to the flanges 6 and 7, are made to project rearwardly from a bridge plate 25 which is held within the hollow of the eye. This bridge plate may be retained in any suitable manner, as by means of an inturn annular flange as 26 provided at the rear edge of the shell 3, or otherwise as may be preferred. It has areas of reduced strength as at 26—26, corresponding to the parts 12—12 of the previous structure and for the same purpose, namely to permit bending adjustment of the eye upon a vertical axis transverse to the cross rod.

In this instance the connector member, here indicated by the reference character 27, instead of extending from front to rear of the eye as in the previous structure is disposed vertically of the eye so that its long forward edge as at 28 will stand in suitable close proximity to the equally long rear face as 29 of the bridge plate 25, the engagement of these two long faces serving to hold the eye against any movement rotatably of the cross rod except with accompanying movement of the connector member as when the parts are being manually adjusted. At other times the engagement of the surfaces 28 and 29 will cause the eye to rotate with the cross rod and connector member the same as is effected by engagement of the connector member with the end walls 22—22 of the bridge in the previous structure.

In this modification it is also suggested that if desired the weight H may, instead of being carried upon a part fixed directly to the cross rod as in the previous structure, may be carried by an arm as 30 which is fixed to or made a part of the eye. The arm 30 is indicated as being formed as an extension of the material comprising the bridge plate 25, and it may be bendable if desired to enable the weight to be adjusted to the most appropriate locality. A weight of this character attached to one eye of a set would be sufficient since the gravity action thereof would be communicated to the other eye through the cross rod, after the manner suggested for instance in the patent to Alexander Konoff 1,607,992.

In the structure illustrated in Figs. 7 to 9 the member corresponding with the bridge plate 25 of the structure Figs. 4 to 6 is made relatively deeper than in Figs. 4 to 6 so that it constitutes in effect an inner shell as 31 fitting snugly to the entire interior surface of the outer shell 3. It carries a pair of rearwardly extending arms or flanges 32 and 33 corresponding to arms 23 and 24 of the previous structure and serving the same purpose as said arms 23 and 24. The side wall portions however are preferably slit, as suggested at 34—34, so that said side walls consist of a series of spring fingers as 35—35 collectively defining the necessary semi-spherical base or support of the outer shell. The outer shell will of course serve to hold all of the spring fingers in their correct semispherical positions while, inversally, the fingers will provide a smooth and uniform frictional grip against the inner surface of the outer shell sufficiently strong to hold the outer shell connected against possibility of accidental displacement while at the same time rendering the outer shell universally adjustable about the inner shell. It will be understood of course that the inner shell is normally of a slightly greater diameter than the inner surface of the outer shell and that the application of the outer shell onto the inner shell will produce such a crowding of the spring fingers as to generate the frictional grip necessary to retain the two shells adjustably connected together. Each of the shells is slightly more than half a sphere so as to avoid tendency for the outer shell to be discharged from its enveloping position.

By this structure it will be apparent that the iris carrying portion of the eye, in addition to having the various features of adjustment longitudinally of the cross rod, rotatably of the cross rod, and rotatably on a vertical axis transverse to the cross rod, as in the previous figures, is also, by reason of its universal mounting upon the inner shell, capable of equally easy adjustment about a horizontal axis transversely of the cross rod, which latter adjustment is of considerable importance particularly in instances where eye lashes are connected with the outer shells and must be brought into proper operating register and alignment with the eye openings of the doll head.

The universal mounting of the outer shell upon the inner shell of course provides adjustment of the outer shell upon a vertical axis transversely of the cross rod without resorting to the use of bendable parts 12 and 26 of the previous figures, and here it is noted that if desired the iris carrying shell 3 as illustrated in the structure Figs. 4 to 6 may be rotatable about the periphery of the bridge plate 25 and thus provide for rotary adjustment of the shell upon a horizontal axis transversely of the cross rod, in combination with the bendable regions 26 for facilitating rotary adjustment of the shell about a vertical axis transversely of the cross rod.

The modification Figs. 7 to 9 also suggests a form of connector member, as 36 differing from the connector members 14 and 27 in that in this instance the piece of metal or other spring material from which it is formed is bent at one end to provide an elongated spring sleeve 37 for receiving the cross rod, and for frictionally gripping the cross rod, while the remainder of said piece of material extends laterally from the sleeve and into position between a pair of stops as 38 and 39 provided to receive it upon the inner shell, said stops being disposed to engage the end of the connector member for holding the shell against any appreciable rotary movement about the cross rod without accompanying movement of the connector member, in the same manner and for the same purpose as described with respect to the engagement of the connector member with the opposite end walls 22—22 in Figs. 1 to 3 and with regard to the engagement of the long edge surface 28 of the connector member with the surface 29 of the bridge plate in the structure Figs. 4 to 6.

The arms 32 and 33 are spaced apart a greater distance than the length of the sleeve 37 so as to leave open spaces at opposite sides of the connector member for permitting automatic adjustment of the eyes longitudinally of the cross rod in substantially the same manner as hereinbefore.

While the eyes are herein shown and described as being supported upon a straight cross rod which extends between the eyes, the eyes being attached to opposite ends of the cross rod, it is to be understood that the invention is not limited to the use of a support of this particular character since obviously any other type of support could be used as well which embodies the characteristics hereinabove pointed out for the connection between the support and the eye shell.

As many changes could be made in this construction without departing from the scope of the invention as defined in the following claims, it is intended that all matter contained in the above description, or shown in the accompanying drawings, shall be interpreted as illustrative only and not in a limiting sense.

Having thus described my invention, what I claim as new and desire to secure by Letters Patent is:—

1. In an eye set, an eye shell part, a supporting part therefor, one of said parts having spaced bearing apertures through which a portion of the other part extends, and a connector member carried by one of said parts intermediate the spaced bearing apertures of the other part to hold said parts assembled.

2. In an eye set, an eye shell part, a supporting part therefor, one of said parts having spaced bearing portions with which a portion of the other part engages, and a connector member carried by one of said parts intermediate the spaced bearing portions of the other part to hold said parts assembled, the connector member being spaced from the bearing portions to permit free movement of the eye shell part in one direction with respect to the supporting part.

3. In an eye set, an eye shell part, a supporting part therefor, one of said parts having spaced bearing portions with which a portion of the other part engages, a connector member carried by one of said parts intermediate the spaced bearing portions of the other part to hold said parts assembled, and means providing for freedom of movement of the eye shell part with respect to the supporting part in one direction.

4. In an eye set, an eye shell part, a supporting part therefor, means connecting said parts together permitting free movement of the eye shell part in a direction toward and away from the other eye shell part of the set, limiting means to confine said free movement within limits, and means whereby said limiting means is adjustable at will.

5. An eye set comprising a pair of eyes, a rotatable support for said eyes, connecting means by which said eyes are connected spaced apart upon the support to rotate therewith, said connecting means for the eyes respectively including parts affording a free movement of the eyes within limits toward and away from each other and with respect to the connecting means, and means whereby the connecting means for the eyes respectively are adjustable toward and away from each other.

6. In an eye set, an eye shell part, a rotatable supporting part therefor, means connecting said parts to rotate together but permitting free movement of the eye shell part in a direction toward and away from the other eye shell part of the set, said connecting means being constructed to confine said free movement within limits, and said limiting means being constructed to permit manual adjustment of the eye shell part in various directions with respect to the supporting part.

7. In an eye set, an eye shell part, a supporting part therefor, means connecting said parts together permitting free movement of the eye shell part in a direction toward and away from the other eye shell part of the set, said connecting means including limiting parts to confine said free movement within limits, and said connecting means consisting of a member having a spring grip upon the supporting part permitting both sliding and rotary movement of said member upon the supporting part for thereby permitting manual adjustment of the eye shell part in various directions with respect to the supporting part.

8. In an eye set, an eye shell part having a pair of members spaced away from each other, a supporting member extending through bearing apertures provided in said spaced members to rotatably and slidably support the eye shell part, and a connector member attached to the supporting member intermediate said spaced members to thereby retain the eye shell part connected with the supporting member.

9. In an eye set, an eye shell part having a pair of bearings spaced away from each other, a supporting member extending through said spaced bearings to rotatably and slidably support the eye shell part, and a connector member attached to the supporting member intermediate said spaced bearings and operatively engaging the eye shell part to thereby retain the eye shell part connected with the supporting member, said connector member being constructed to have a spring grip upon the supporting member to thereby render it manually adjustable with respect to the supporting member.

10. In an eye set, an eye shell part having a pair of bearings spaced away from each other, a supporting member extending through said spaced bearings to rotatably and slidably support the eye shell part, and a connector member attached to the supporting member intermediate said spaced bearings and operatively engaging the eye shell part to thereby retain the eye shell part connected with the supporting member, said connector member being spaced from both of said bearings to thereby permit limited free movement of the eye shell part with respect to the supporting member.

11. In an eye set, an eye shell part having a pair of bearings spaced away from each other, a supporting member extending through said spaced bearings to rotatably and slidably support the eye shell part, a connector member attached to the supporting member intermediate said spaced bearings and operatively engaging the eye shell part to thereby retain the eye shell part connected with the supporting member, said connector member being spaced from both of said bearings to thereby permit limited free movement of the eye shell part with respect to the supporting member, and said connector member being constructed to have a spring grip upon the supporting member to thereby render it manually adjustable along the supporting member.

12. In an eye set, a connector member by which to connect the eyes to their supporting part, said connector member comprising an elongated piece of springy material having an opening formed therethrough at one point in its length intended to receive the supporting part forced thereinto, said piece of material being formed with a slit extending longitudinally thereof communicating with said opening whereby to render opposite wall parts of said opening resilient with respect to each other to thus provide a spring grip of said wall parts upon the supporting member, a supporting part held in said opening, and an eye held to said supporting part by means of said connector member.

13. In an eye set, an eye shell part having a pair of bearings spaced away from each other, a supporting member extending through said spaced bearings to rotatably and slidably support the eye shell part, a connector member attached to the supporting member intermediate said spaced bearings to thereby retain the eye shell part connected with the supporting member, said connector member being spaced from both of said bearings to thereby permit limited free movement of the eye shell part with respect to the supporting member, said connector member being constructed to have a spring grip upon the supporting member to thereby render it manually adjustable longitudinally and rotatably of the supporting member, and the eye shell part and said connector member having interengaging portions insuring rotary adjustment of the eye shell part co-incident with any rotary adjustment of the connector member, together with means whereby the eye shell part is rotatably adjustable upon a vertical axis transverse to a line extending between the two eye shell parts of the set.

14. In an eye set, a semispherical eye shell part having a bridge portion extending diametrically across the rear open side thereof, flanges formed upon said bridge and projecting forwardly into the hollow of the eye shell part providing a pair of bearing openings spaced away from each other within the eye shell part, a cross rod extending into the eye shell part and passing through said bearing openings, a connector member engaging the cross rod intermediate said flanges having a portion spaced from the cross rod in engagement with a portion of the bridge, means whereby the connector member is adjustable rotatably and longitudinally of the cross rod for imparting similar adjustment to the eye shell part, and means whereby the bridge is bendable to enable rotary adjustment of the eye shell part upon an axis transverse to the length of the cross rod.

15. In an eye set, an eye shell part, a supporting part therefor, one of said parts having spaced bearing apertures through which a portion of the other part extends, and a connector member carried by one of said parts secured thereto normally immovable with respect to said part independently of the other part and intermediate the spaced bearing apertures of said other part to hold said parts assembled.

16. In an eye set, an eye shell part, a supporting part therefor, one of said parts having spaced bearing portions with which a portion of the other part engages, and a connector member carried by one of said parts secured thereto normally immovable with respect to said part independently of the other part and intermediate the spaced bearing portions of said other part to hold said parts assembled, the connector member being spaced from the bearing portions to permit free movement of the eye shell part in one direction with respect to the supporting part.

17. In an eye set, an eye shell part, a supporting part therefor, one of said parts having spaced bearing portions with which a portion of the other part engages, a connector member carried by one of said parts secured thereto normally immovable with respect to said part independently of the other part and intermediate the spaced bearing portions of said other part to hold said parts assembled, and means providing for freedom of movement of the eye shell part with respect to the supporting part in one direction.

18. In an eye set, an eye shell part, a supporting part therefor, means connecting said parts together permitting free movement of the eye shell part in a direction toward and away from the other eye shell part of the set, limiting means to confine said free movement within limits, and said limiting means being constructed to normally immovably grip the supporting part but to be manually adjustable thereon at will.

19. In an eye set, an eye shell part having a pair of members spaced away from each other, a supporting member extending through bearing apertures provided on said spaced members to rotatably and slidably support the eye shell part, and a connector member secured normally immovably upon the supporting member independently of the eye shell part but in the space between said spaced members to thereby retain the eye shell part connected with the supporting member.

20. In an eye set, an eye shell part having a pair of bearings spaced away from each other, a supporting member extending through said spaced bearings to rotatably and slidably support the eye shell part, and a connector member secured normally immovably upon the supporting member independently of the eye shell part and in the space between said spaced bearings and operatively engaging the eye shell part to thereby retain the eye shell part connected with the supporting member, said connector member being spaced from both of said bearings to thereby permit limited free movement of the eye shell part with respect to the supporting member.

21. In a doll's eye construction, the combination of an eye, a back member on the eye provided with a forwardly extending perforated lug, a supporting rod inserted through the perforation of said lug, said back member having a slot formed therethrough beyond the lug perforation, and securing means engaging the back member and having a part projecting through said slot into connection with the rod to thereby hold the eye assembled with the rod.

In testimony whereof I affix my signature.

SAMUEL MARCUS.